(12) United States Patent
Zehfuss

(10) Patent No.: US 9,101,227 B2
(45) Date of Patent: Aug. 11, 2015

(54) HOOK-ON HIGHCHAIR

(75) Inventor: Mark Zehfuss, Glen Allen, VA (US)

(73) Assignee: Baby Jogger, LLC, Richmond, VA (US)

( * ) Notice: Subject to any disclaimer, the term of this patent is extended or adjusted under 35 U.S.C. 154(b) by 823 days.

(21) Appl. No.: 12/947,421

(22) Filed: Nov. 16, 2010

(65) Prior Publication Data

US 2012/0119460 A1    May 17, 2012

(51) Int. Cl.
*A47D 1/10* (2006.01)
*B62B 9/12* (2006.01)
*B62B 9/00* (2006.01)
*B62B 9/10* (2006.01)
*B62B 7/14* (2006.01)

(52) U.S. Cl.
CPC .............. *A47D 1/106* (2013.01); *B62B 7/142* (2013.01); *B62B 9/102* (2013.01); *B62B 2206/006* (2013.01)

(58) Field of Classification Search
CPC ...................................................... A47D 1/106
USPC ................... 297/174 R, 174 CS, 134, 256.16
See application file for complete search history.

(56) References Cited

U.S. PATENT DOCUMENTS

| | | | | | |
|---|---|---|---|---|---|
| 2,504,897 | A | * | 4/1950 | Stanton | 297/174 CS |
| 3,126,226 | A | * | 3/1964 | Johnson | 297/174 CS |
| 4,312,535 | A | * | 1/1982 | Smith | 297/174 CS |
| 4,415,200 | A | * | 11/1983 | Bourne | 297/174 CS |
| 4,506,928 | A | * | 3/1985 | Marion | 297/174 CS |
| 4,568,120 | A | * | 2/1986 | Hoffman | 297/174 CS |
| 4,585,271 | A | * | 4/1986 | Wu | 297/174 CS |
| 4,586,746 | A | * | 5/1986 | Day et al. | 297/174 CS |
| 4,629,247 | A | * | 12/1986 | Wu | 297/174 CS |
| 4,664,396 | A | * | 5/1987 | Pietrafesa | 280/30 |
| 4,818,016 | A | * | 4/1989 | Mariol et al. | 297/174 CS |
| 4,863,216 | A | * | 9/1989 | Prescott | 297/174 CS |
| 6,273,503 | B1 | * | 8/2001 | Cheng | 297/174 CS |
| 6,679,549 | B2 | * | 1/2004 | Catelli | 297/174 CS |
| 6,736,451 | B1 | * | 5/2004 | Chen | 297/174 CS |
| 7,591,506 | B2 | * | 9/2009 | Flannery | 297/174 CS |
| 7,621,592 | B1 | * | 11/2009 | Flannery | 297/134 |
| 7,845,719 | B2 | * | 12/2010 | Flannery | 297/174 CS |
| 2002/0185895 | A1 | * | 12/2002 | Marshall | 297/153 |
| 2007/0040430 | A1 | * | 2/2007 | Flannery | 297/271.6 |
| 2010/0231019 | A1 | * | 9/2010 | Berkey et al. | 297/256.1 |

FOREIGN PATENT DOCUMENTS

| | | | | |
|---|---|---|---|---|
| FR | 2700456 A1 | * | 7/1994 | |
| GB | 2068716 A | * | 8/1981 | A47C 1/032 |
| WO | WO 2008141492 A1 | * | 11/2008 | A47D 1/10 |

* cited by examiner

*Primary Examiner* — David R Dunn
*Assistant Examiner* — Tania Abraham
(74) *Attorney, Agent, or Firm* — Bernard G. Pike; Pike IP Law, PLLC

(57) ABSTRACT

A child seat apparatus that may be engaged on the end of a table top so as to be used as a hook on high chair and that also may be set on the floor to be used as a rocker. The apparatus includes a base that includes longitudinal curved members. A rear portion of the base can be disengaged from the front portion of the base such that, when used as a hook on high chair, the rear portion can swing to an out-of-the-way position underneath front portion, so that the rear portion does not protrude into kitchen or dining room space.

19 Claims, 5 Drawing Sheets

HOOK-ON HIGHCHAIR

FIELD OF THE INVENTION

The invention is directed to hook-on highchairs. Embodiments of the hook-on high chair comprise a releasable connector for a child seat. The child seat may be also capable of being attached to a stroller frame, used as a car seat, or fastened in a car seat base, for example, so the child seat may be connected to different frames or bases.

BACKGROUND OF THE INVENTION

Conventional highchairs have elevated seats that provide a child seat at a more convenient height allowing a parent to more easily feed or otherwise care for a child. On a standard highchair, the highchair seat is elevated on relatively long legs as compared to a standard chair for use by an adult. Such highchairs may also include a tray that may be fixed, removable or hingedly attached.

Other highchairs, referred to as hook-on highchairs, comprise a frame with a table edge receiving portion and a permanently attached seat. The table edge receiving portion may be slid over a table edge to provide support for the highchair to allow a child to eat or play at a table. When installed on a table edge, the hook-on high chair does not have legs that reach to the floor but is supported from the table itself. Various embodiments of hook-on highchairs are described, for example, in U.S. Pat. Nos. 4,530,539; 4,568,120; 4,863,216; 6,736,451; and 7,621,592.

In addition, conventional strollers may include a stroller frame with releasable connectors and a removable seat that allows a traditional stroller seat to be removed from the stroller frame and replaced with a bassinet, a car seat, or other child carrying seat, for example. Further, some car seats may comprise a base portion that may be secured to the seat of a car by a seat belt and/or other straps attached to the car. As such, car seat may be removably secured to the car seat base. This allows the parent flexibility to easily move the child in the car seat directly onto the stroller frame without removing the car seat base from the car or removing the child from the car seat. The car seat may be simply moved from the car base and installed on the stroller base without disturbing the child.

However, this convenience is not available when a parent wishes to move a child from the stroller to a highchair. Currently, hook-on highchairs have permanently attached seats that add to the weight and size of the hook-on highchair. Therefore, there currently exists a need for a hook-on highchair frame that allows a stroller seat, car seat, or other child seat to be attached so a parent does not have to carry a highchair with them when they go to a restaurant, errands or visit relatives or friends with their child.

There exists a further need for a hook-on high chair frame that is compatible with a stroller seat or a car seat providing convenience and a clean hygienic seat for a child.

SUMMARY OF THE INVENTION

Embodiments of a frame for supporting a hook-on highchair or other seat from a table ("hook-on highchair frame") comprise a releasable connector for removably connecting a child seat to the frame. The child seat may be a stroller seat, bassinet, or a car seat, for example. In a more particular embodiment, the connector for releasably connecting a child seat is substantially the same as the connector for releasably connecting a child seat to a stroller frame. As such, the same seat may be connected to the stroller and to the hook-on high chair frame, as desired.

Further embodiments of the frame hook-on highchair may be foldable to allow easy storage and convenient carrying of the hook-on highchair frame. The folded frame may be carried in the storage basket of a stroller frame with a compatible stroller seat for use with the hook-on highchair frame, for example. The folded hook-on highchair frame may be stored in the storage space of the stroller frame, for example, and removed to allow the use of the stroller seat as a highchair at a restaurant.

Embodiments also include a method preparing a hook-on highchair for a child comprising connecting a frame for a hook-on child seat to a table and attaching a child seat to the frame. In one embodiment, the child seat may be first removed from a stroller frame and then attached to the frame of the hook-on highchair. In further embodiments, the child seat may be removed from the highchair and then attached or reattached to the stroller frame. In a particular embodiment, the frame for the hook-on highchair may be removed from the table and folded to a non-use or storage position. In other embodiments within the child seat is a car seat, the child seat may be removed from the frame of the hook-on highchair and then attached or reattached to a car seat base.

Aspects of the hook-on highchair frame are presented in various embodiments; however, one skilled in the art will understand various variation and interchangeability of the components of the various embodiments which are intended to be included in the scope of the invention.

DETAILED DESCRIPTION

Figure 1:
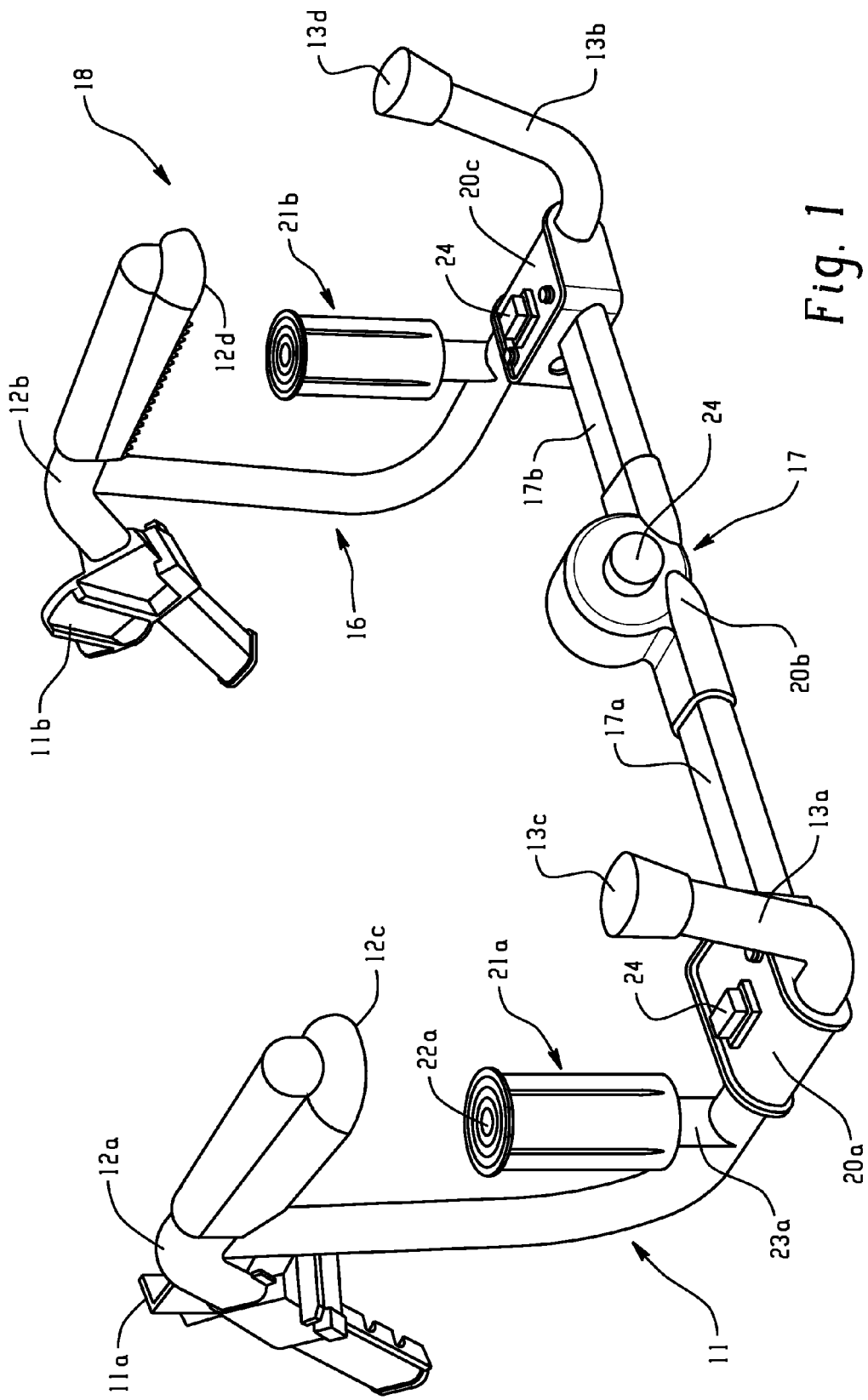
FIG. 1 depicts an embodiment of the hook-on highchair frame comprising a releasable connection for a child seat such as a stroller seat, the hook-on highchair frame is in an unfolded or in-use position.

Embodiments of a hook-on highchair frame for supporting a seat from a table comprise a releasable connector for releasably connecting a child seat. The releasable connector may be any connector that may be used to releasably connect a child seat to the frame. In such an embodiment, the hook-on highchair comprises a hook-on highchair frame and a child seat.

Many strollers have child seats that may be removed and reconnected without the use of special tools ("releasably connected"). This allows a parent, guardian, or other responsible person such as a sitter ("parent") to remove the stroller seat from the stroller frame and replace it with an appropriate seat to meet their current needs, such as by releasably connecting a bassinet, a car seat, a reclining seat designed for infants, or any other desired child seat. The stroller frames comprise a releasable connector portion that may receive and connect with an attachment portion of the child seat. Many stroller frames comprise two releasable connectors and the stroller seats comprise two complementary attachment portions; typically the two releasable connectors comprise a left releasable connector and a right releasable connector. To provide interchangeability of seats, the attachment portions on at least two of the stroller seat, the bassinet, the car seat, the reclining seat designed for infants, and/or any other desired child seat are complementary to the connector portion on the stroller frame. In this way, any of the child seats with compatible attachment portions are interchangeable with each other on the stroller frame. This provides adaptability and convenience of the stroller frame for the user. There are several different releasable connector types presently available for strollers and other devices and any releasable connector may be used on the hook-on highchair frame. Such releasable connectors may be included on the hook-on highchair frame, for example. Releasable connections include, but are not limited to, tab in slot connectors, tube within tube connectors, friction fittings, interference fittings, threaded connections, locking tabs, keyed connections, other fasteners, or the like.

In specific embodiments, the hook-on high chair frame comprises a releasable connector that is substantially identical to the releasable connector on a stroller frame. As used herein, a releasable connector is "substantially identical" to another releasable connector if an attachment portion complementary and/or functional with one releasable connector also functions with the other releasable connector. Not all attachment portions that work with one releasable connector need to work with the "substantially identical" releasable connector, but at least one attachment portion must work with both for them to be "substantially identical;" as used herein. A releasable connector is a "secured releasable connector" if the releasable connector and/or the attachment portion has a locking mechanism that holds the connection secure during use. However, the releasable connector and the attachment portion may be disconnected without the use of special tools or special skills. For example, a secured releasable connector may comprise a locking mechanism that interacts with an attachment portion to releasably secure the connection portion to the attachment portion, but may be released by removing a pin, pushing a button or tab, or unbuckling a strap, for example. The locking mechanism may be as simple as a biased tab on the attachment portion engaging a recess in the releasable connector.

The locking mechanism may be a friction locking device or may be an interference locking device such as a pin in a hole or slot, wherein the pin is biased or unbiased, secured by bolt, comprise a threaded cap, a screw, a friction connection, a keyed connection, a rod or cotter pin, a combination of such connections, or any other traditional connection that may secure the seat adjustment mechanism, for example. Any of these locking mechanisms may also be used to secure any hinged connections of the hook-on highchair frame in a specific position.

As such, embodiments of the hook-on high chair frame has a releasable connector that is substantially identical to the releasable connector on a stroller frame, thus a child seat may be removed from the stroller frame, connected to the hook-on highchair frame and reconnected to the stroller frame, as desired. This provides convenience for the parent. For example, the parent does not need to have a stroller and also a complete hook-on highchair. The parent may only take their stroller and a hook-on highchair frame if they want to use a hook-on highchair at a restaurant or other location that does not have a highchair or wherein the parent does not want to use a highchair that may be old, unsafe and/or dirty.

The hook-on high chair frame comprising a releasable connector may comprise a plurality of frame members. The frame members may be integral, permanently fixed together such as by welding, may be releasably or hingedly connected. In embodiments wherein the hook-on highchair frame members are releasably or hingedly connected or a combination of releasably connected and hingedly connected, the frame may be disassembled or folded to a more convenient storage or transportable size.

In certain embodiments, the hook-on highchair frame may comprise at least one upper frame member and at least one lower frame member. The combination of an upper frame member and the lower frame member allows the hook-on highchair to be cantilevered on a tabletop to securely support the child seat on a table. The upper frame member and lower frame member may form a tabletop receiving portion for receiving a tabletop edge.

An embodiment of a hook-on highchair frame 10 comprising two releasable connectors 11a 11b is shown in FIG. 1. The hook-on highchair frame 10 comprises two upper frame members 12a 12b and two lower frame members 13a 13b. When the hook-on highchair frame 10 is installed on a table, the upper frame members 12a 12b will contact the upper surface of the tabletop with contact points 12c 12d and lower frame members 13a 13b will contact the lower surface of the tabletop with contact points 13c 13d providing a cantilevered support for the hook-on highchair 10. The tabletop contact points of the hook-on highchair may comprises a slip resistant gripping material such as rubber to provide a more secure attachment to the tabletop as in the embodiment shown in FIG. 1.

The frame members may be constructed of any appropriate material including, but not limited to, metals, steel, aluminum, plastics, wood, or a combination of such materials, for example, and be of appropriate structures, including but not limited to, solid, tubular, beam or other structures. In the embodiment shown in FIG. 1, the left side lower frame member 11a and left side upper frame member 12a are metallic tubular frame members and are integrally formed, welded together, to form a left side frame member 11. In other embodiments, these frame members may be releasably connected or be connected through intermediate frame members or other components. Thus, the hook-on highchair 10 has a left side frame member 11 and right side frame member 16 that are connected by an intermediate cross member 17.

Figure 2:
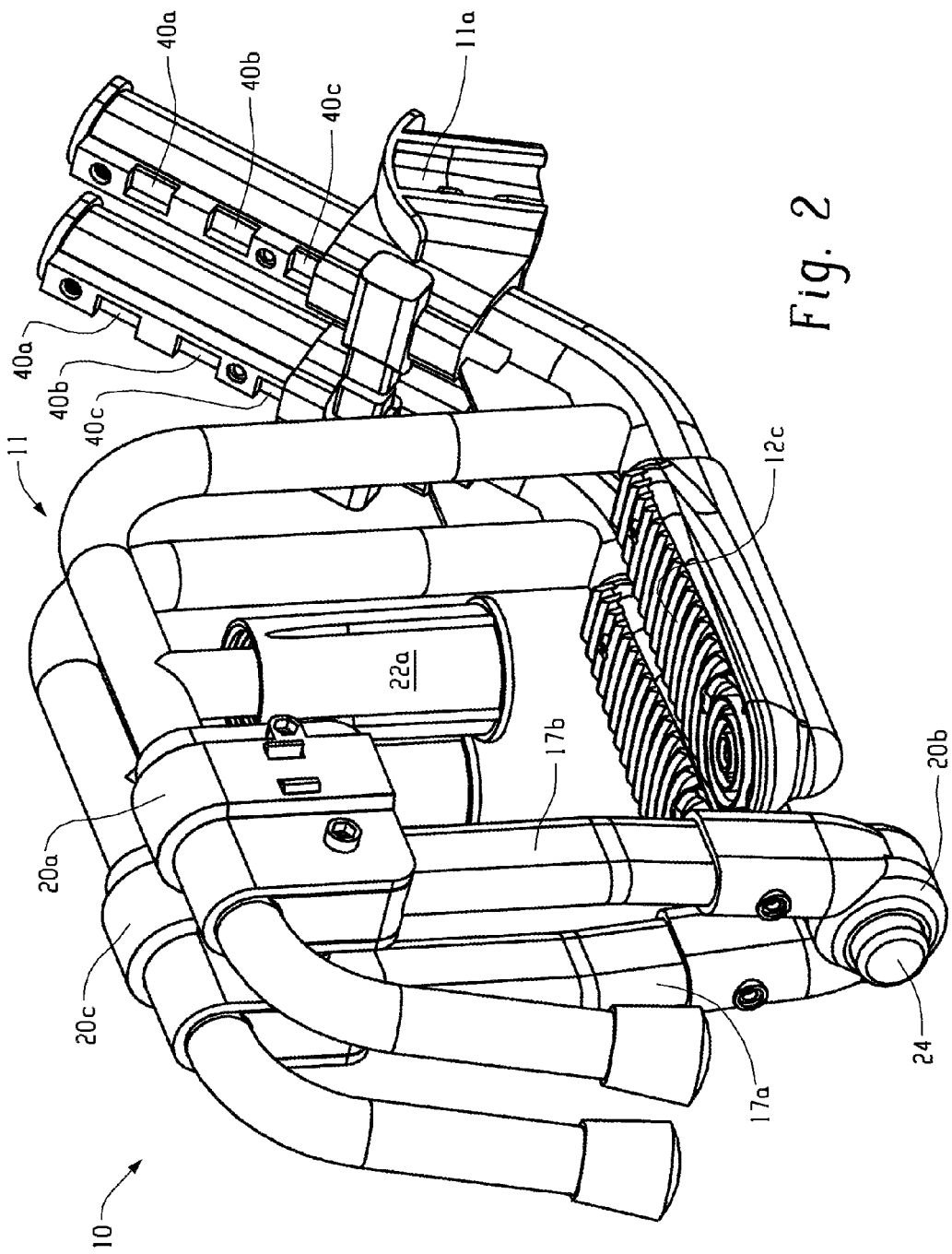
FIG. 2 depicts an embodiment of the hook-on highchair frame comprising a releasable connection for a child seat such as a stroller seat, the hook-on highchair frame is in a folded or storage position.

For convenient storage and transporting, embodiments of the hook-on highchair frame may comprise a foldable frame. Since embodiments of the hook-on highchair frame do not include a child seat, the frame may be easily and/or more compactly folded. The foldable frame of the embodiment shown in FIG. 1 comprises the intermediate cross member 17 that connects the left side frame 16 and the right side frame 11. The cross member 17 comprises two hingedly connected intermediate frame members 17a and 17b. Left intermediate frame members 17a is also hingedly connected to the left side frame member 11 and the right intermediate frame member 17b is hingedly connected to the right frame member 16. The three hinged connections allow the frame to be easily and compactly folded. In the embodiment shown in FIGS. 1 and 2, each of the hinged folding connections 20a, 20b, and 20c comprises a locking mechanism that may lock the connection in the unfolded position or in the folded position. The embodiment of the hook-on highchair frame 10 in the folded position is shown in FIG. 2.

The folding mechanisms 20a, 20b and 20c each comprise a locking mechanism. The locking mechanisms may be disengaged by pushing a button 24 on the locking mechanism. The button disengages a pin from a hole or recess in the frame member and allows the intermediate member to be rotated relative to the side frame member or to the other intermediate member, if present. When the intermediate member is rotated to the folded position or the unfolded position, the pin is biased and engages another hole or recess in the frame member (or a component attached to the frame member) to hold the intermediate frame in position until the button is again pushed to disengage the pin. Other embodiments of the hook-on highchair frame may comprise other locking mechanisms on the hinged connections or may not comprise a locking mechanism. In embodiments wherein there is no locking mechanism on a hinged connection, the hinged connection may be prevented from over rotating by the use of rotational limiting stops on the frame members. Further embodiments of the hook-on highchair frame may comprise a locking mechanism only for locking the hook-on highchair frame in the unfolded or in use position.

Further embodiments of the hook-on highchair may comprise at least one clamping mechanism. In the embodiment shown in FIG. 1, the hook-on highchair frame comprises two clamping mechanisms 21a 21b. The clamping mechanism 21a comprises an internally threaded cap 22a and a threaded post 23a. The threaded cap 22a may be rotated on the threaded post 23a to move the threaded cap 22a toward or away from the table top to secure the hook-on highchair frame 10 to the tabletop. Other embodiments of clamping mechanisms may be used such as spring loaded clamps, threaded rods though a threaded hole, frictional clamps, pin and hole mechanism, or other such clamping mechanisms. In some embodiments, the hook-on highchair frame may not include any clamping mechanism and be securely held in place with the cantilever forces of the upper and lower frame members. Other embodiments of the hook-on highchair may only have a clamping mechanism to secure the frame to the tabletop.

In embodiments of the hook-on highchair frame comprising a table edge receiving portion, the table edge receiving portion comprises the at least a portion of one upper frame member and at least a portion of one lower frame member. In such an embodiment, the upper frame member and lower frame member are separated by a distance greater than a thickness of a typical table top so the tabletop receiving portion may be slid over the edge of a tabletop.

In an embodiment of a method of preparing a hook-on highchair may comprise connecting a hook-on highchair frame to a table and attaching a child seat to the frame. The hook-on highchair frame may be connected to the table by simply sliding a table edge receiving portion of the hook-on highchair frame over a table edge. The method may further comprise removing the child seat from stroller. In such an embodiment, both the hook-on highchair frame and the stroller frame comprise a releasable connector for connecting the child seat. The releasable connector may comprise a recess for receiving a locking tab on the child seat.

Another embodiment may comprise a stroller and hook-on highchair wherein the a child seat has a seat attachment portion and the stroller frame comprises a connector capable of receiving the seat attachment portion and the hook-on highchair also comprises a connector capable of receiving the seat connector.

In an embodiment of the method, the hook-on highchair frame 10 may be lifted and slid onto the table top such that the upper frame member or the contact surface of the upper frame member engage the upper surface of the table top and such that the lower frame member or the contact surface of the lower frame member engages the lower surface of the table top. The weight of the child seat result in a pressure exerted on the gripping surfaces and secures the hook-on highchair frame to the tabletop. As described above, the hook-on highchair frame may further comprise a clamping mechanism. As such, the method may further comprise clamping the hook-on highchair to a table top. In the embodiment of FIG. 1, the internally threaded cap 21a may be rotated on the threaded post 23a to move the threaded cap against bottom surface of the tabletop to secure the hook-on highchair frame.

Figure 3:
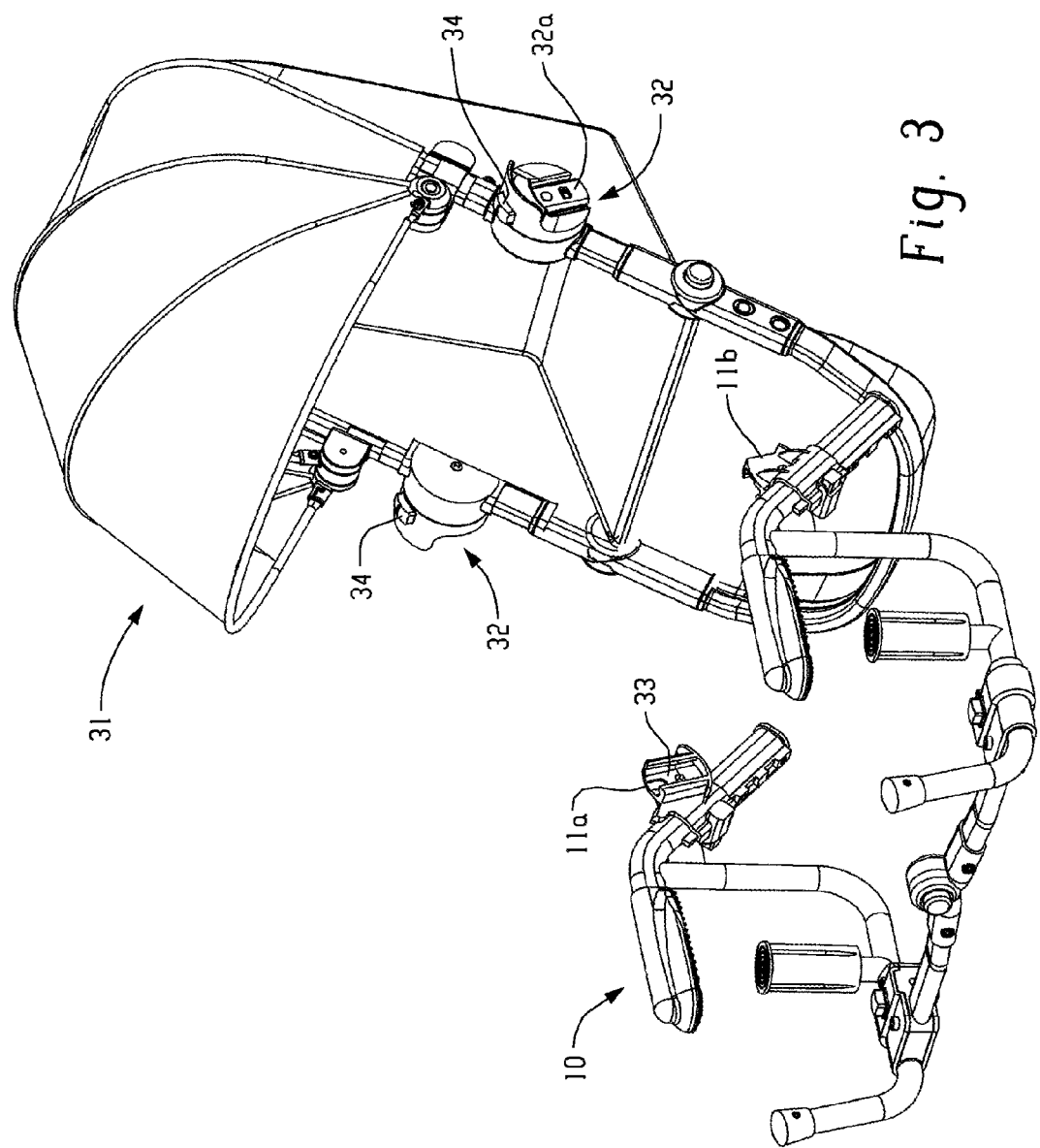
FIG. 3 depicts an embodiment of the hook-on highchair frame comprising a releasable connection for a child seat and a stroller seat with an attachment portion that may be releasably connected to the hook-on highchair frame.

As seen in FIG. 3, a child seat 31 may then be connected to the hook-on-highchair seat frame 10. The child seat 31 may be secured on the releasable connectors 11a 11b. For example, a stroller seat 31 may be connected by pushing the attachment portions 32 of the stroller seat into the releasable connectors 11a 11b of the hook-on highchair frame 10. In one embodiment, the attachment portion 32 of the stroller seat comprises a biasing tab 32a that may be biased inwardly when the attachment portion 32a of the stroller seat 31 is pushed within a recess 33 of the releasable connector 11a until the tab aligns with the aperture in the releasable connector 11a. The tab will then bias into the aperture to releasably secure the stroller seat 31 on the frame 10. To remove the stroller seat, the tab may then be biased inwardly by the parent to release the stroller seat from the frame by pushing spring biased buttons 34. The stroller seat 31 may then be easily lifted from the hook-on-chair frame 10. If desired, the stroller seat 31 may similarly be releasably connected to a stroller frame (not shown) to transport the child. In the same manner, a car seat may be attached to the hook-on highchair frame.

Figure 4:
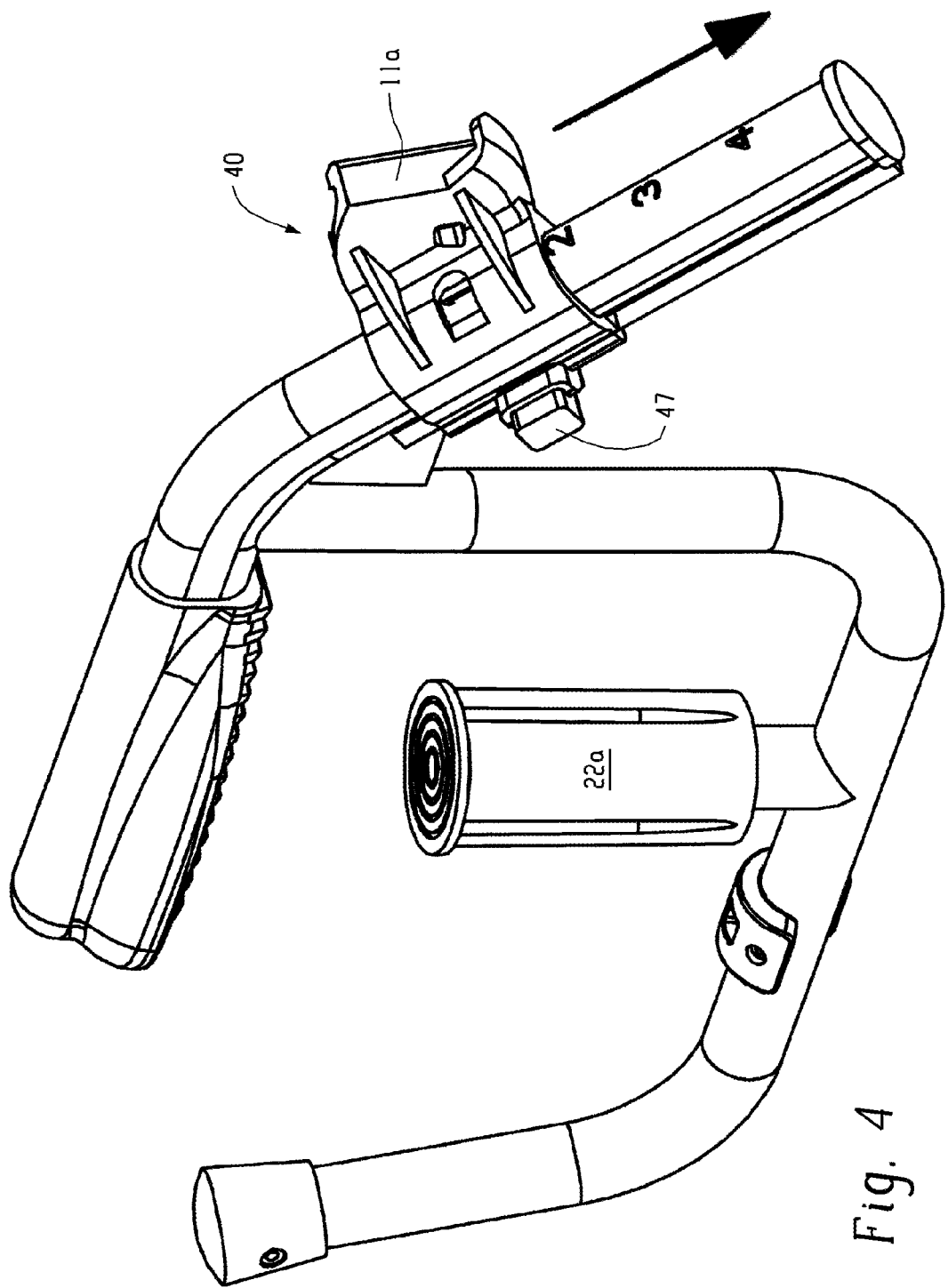
FIG. 4 depicts an embodiment of the seat position adjustment for the hook-on highchair frame.

Further embodiments of the hook-on highchair frame may comprise a seat adjustment mechanism 40. An embodiment of the seat adjustment mechanism is shown in FIG. 4. The seat adjustment mechanism 40 may be used to adjust the position of the child seat on the hook-on highchair frame. The seat adjustment mechanism 40 may be used to move the seat that is connected to releasable connector in a vertical direction to raise the seat for a child of a different height, move the seat in a horizontal direction to move the seat closer or further from the table top, or to move the seat in both a vertical and horizontal direction. In the embodiment shown in FIG. 4, the seat adjustment mechanism 47 comprises a locking mechanism, the locking mechanism comprises a biased button 47 that may be pressed to move a pin out of one of the recesses 40a 40b 40c (See FIG. 2) in the frame or a component attached to the frame. The adjustment mechanism may then be moved up or down the frame and the button released to secure the adjustment mechanism in a different position on the frame.

Figure 5:
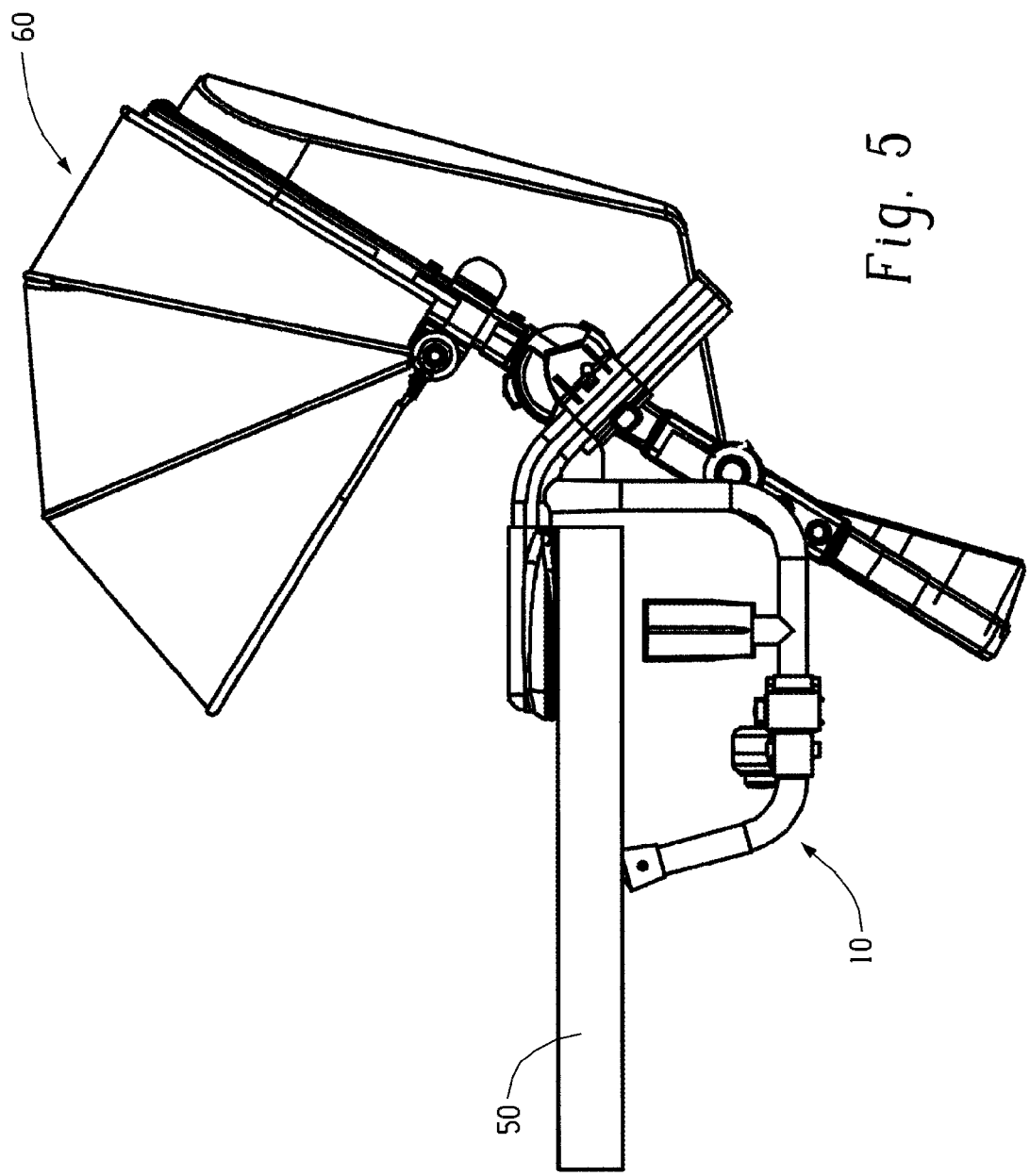
FIG. 5 depicts an embodiment of a hook-on high chair with a stroller seat releasably connected to the hook-on high chair frame and attached to a table top.

FIG. 5 depicts an embodiment of a hook-on high chair 10 with a stroller seat 60 releasably connected to the hook-on high chair frame and attached to a table top 50. The table top receiving portion of the hook-on highchair frame has been slid over the table 50 to secure the hook-on highchair frame. The child seat is shown releasably connected to the frame.

Thus, the invention disclosed herein may be embodied in other specific forms without departing from the spirit or general characteristics thereof, some of which forms have been indicated, and the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

The invention claimed is:

1. A frame for supporting a child seat from a table, comprising:
   a frame comprising
      a table edge receiving portion, wherein the table edge receiving portion is defined by a lower frame member having a lower frame contact point and an upper frame member having an upper frame contact point to allow the frame to be cantilevered on the table, wherein the upper frame member comprises a upper frame portion comprising the upper frame contact point and a seat adjustment portion;
      a clamping mechanism connected to the lower frame member to secure the frame on the table;
      a connector for removably connecting the child seat to the frame on the seat adjustment portion of the upper frame; and
      a seat adjustment mechanism connected to the connector and slidably connected to the seat adjustment portion of the upper frame, wherein the seat adjustment mechanism comprises a locking mechanism and the seat adjustment portion of the upper frame angles downward from the upper frame portion such that the connector and seat adjustment mechanism may be slid along the seat adjustment portion of the frame to simultaneously move the connector in both a vertical direction and a horizontal direction relative to the upper frame contact point.

2. The frame of claim 1, wherein the upper frame member and lower frame member are separated by a distance greater than a thickness of a typical table top.

3. The frame of claim 1, wherein the connector comprises a recess for receiving a locking tab on the child seat.

4. The frame of claim 3, wherein the child seat is a car seat, a stroller seat, or a bassinet.

5. The frame of claim 1, comprising:
   a right lower frame member, wherein the lower frame member is a left lower frame member; and
   an intermediate cross member, wherein the intermediate cross member comprises a left intermediate frame member hingedly connected to a right intermediate frame member
   wherein the intermediate cross member is hingedly connected to the left lower frame member and the right lower frame member.

6. The frame of claim 5, wherein the intermediate cross member allows the frame to be folded.

7. The frame of claim 1, wherein the locking mechanism comprises a biased tab that may be inserted into a recess in the frame to fix the connector's position on the frame and may be biased from the recess to allow the connector's position to be adjusted along the frame.

8. The frame of claim 1, wherein the clamping mechanism is one of a spring loaded clamp, a threaded rod though a threaded hole, a frictional clamp, or a pin and hole mechanism.

9. The frame of claim 1, wherein the clamping mechanism comprises an internally threaded cap and a threaded post.

10. The frame of claim 1, wherein the table edge receiving portion is defined by left and right side lower frame members each having a lower frame contact point and left and right side upper frame members each having an upper frame contact point.

11. A method of preparing a hook-on highchair for a child, comprising:
    connecting a frame to a table;
    clamping the frame to the table with a clamping mechanism;
    sliding a locking mechanishm up or down the frame to simultaneously move a seat in both a vertical and horizontal direction, wherein the locking mechanism is on a seat adjustment mechanism;
    securing the seat adjustment mechanism in a locked position on the frame and
    attaching the seat to the frame to a connector on the seat adjustment mechanism.

12. The method of claim 11, comprising:
    removing the child seat from a stroller.

13. The method of claim 11, comprising:
    removing the child seat from a car seat base.

14. The method of claim 11, wherein the frame is removably connected to the table.

15. The method of claim 11, wherein connecting the frame to a table comprises:
    sliding a table edge receiving portion over a table edge.

16. The method of claim 15, wherein the frame comprises at least one upper frame member and at least one lower frame member.

17. The method of claim 16, wherein the table edge receiving portion comprises the upper frame member and the lower frame member and the upper frame member and the lower frame member are separated by a distance greater than a thickness of a typical table top.

18. The method of claim 11, comprising:
    unfolding the frame member.

19. The method of claim 18, wherein unfolding the frame member comprises unlocking a hingedly connected member frame, wherein unlocking comprises pushing a biased button.

* * * * *